(12) United States Patent
Rossiter et al.

(10) Patent No.: US 7,610,268 B2
(45) Date of Patent: *Oct. 27, 2009

(54) PRE-DEFINED HARDWARE AND SOFTWARE BUNDLE READY FOR DATABASE APPLICATIONS

(75) Inventors: Jay Rossiter, Palo Alto, CA (US); David Stowell, Cupertino, CA (US); Pari Bhaduri, Foster City, CA (US); Venkat Malla, Fremont, CA (US); Jane Chen, Millbrae, CA (US); Ramkumar Venkataraman, Foster City, CA (US); Yuanjiang Ou, Redwood City, CA (US); Muthu Olagappan, Chennai (IN); Thivakaram Prakash Sivakumar, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 364 days.

This patent is subject to a terminal disclaimer.

(21) Appl. No.: 11/211,118

(22) Filed: Aug. 23, 2005

(65) Prior Publication Data

US 2006/0004779 A1    Jan. 5, 2006

Related U.S. Application Data

(60) Division of application No. 10/762,949, filed on Jan. 21, 2004, which is a continuation of application No. 09/945,135, filed on Aug. 31, 2001, now Pat. No. 6,988,102, which is a division of application No. 09/240,229, filed on Jan. 29, 1999, now Pat. No. 6,487,547.

(51) Int. Cl.
*G06F 17/30* (2006.01)

(52) U.S. Cl. .................. 707/2; 707/200; 707/204

(58) Field of Classification Search .................. 707/1–2, 707/3–5, 10, 100, 102, 103 Y, 200, 204
See application file for complete search history.

(56) References Cited

U.S. PATENT DOCUMENTS 5,485,610 A    1/1996   Gioielli et al.

(Continued)

FOREIGN PATENT DOCUMENTS

WO     WO 02/19046    *  3/2002

OTHER PUBLICATIONS

Kemper et al. (Performance Tuning for SAP R/3, 1997, IEEE, pp. 1-12).*

(Continued)

*Primary Examiner*—Srirama Channavajjala
(74) *Attorney, Agent, or Firm*—Hickman Palermo Truong & Becker LLP; Eric L. Sutton

(57) ABSTRACT

A database system that incorporates numerous features that reduce the total cost of maintaining the database system is provided. The database system includes a database appliance that executes a database server on a platform that includes a special purpose operating system specifically tailored to the services required by the database server. The hardware may also be specially tailored to the services required by the database server. The database sever may be generated from another database server by modifying the code of the other database server optimize the code for execution on said database appliance. According to another aspect, the database appliance includes an operating system and a database server generated from another database server by modifying the code of the other database server optimize the code for execution on said database appliance.

6 Claims, 10 Drawing Sheets

U.S. PATENT DOCUMENTS

| | | | |
|---|---|---|---|
| 5,819,030 A * | 10/1998 | Chen et al. ................. 709/220 |
| 5,950,188 A * | 9/1999 | Wildermuth ................... 707/3 |
| 6,006,216 A * | 12/1999 | Griffin et al. ................... 707/2 |
| 6,012,032 A | 1/2000 | Donovan et al. |
| 6,026,433 A | 2/2000 | D'Arlach et al. |
| 6,052,695 A * | 4/2000 | Abe et al. .................. 707/202 |
| 6,067,557 A * | 5/2000 | Hegde ........................ 718/103 |
| 6,075,938 A * | 6/2000 | Bugnion et al. ............... 703/27 |
| 6,076,166 A | 6/2000 | Moshfeghi et al. |
| 6,115,715 A * | 9/2000 | Traversat et al. ............ 707/100 |
| 6,247,032 B1 | 6/2001 | Bernardo et al. |
| 6,298,341 B1 | 10/2001 | Mann et al. |
| 6,374,256 B1 | 4/2002 | Ng et al. |
| 6,378,128 B1 * | 4/2002 | Edelstein et al. ............. 717/174 |
| 6,460,141 B1 | 10/2002 | Olden |
| 6,487,547 B1 * | 11/2002 | Ellison et al. ................... 707/2 |
| 6,516,416 B2 | 2/2003 | Gregg et al. |
| 6,553,412 B1 | 4/2003 | Kloba et al. |
| 6,640,278 B1 | 10/2003 | Nolan et al. |
| 6,654,756 B1 * | 11/2003 | Quernemoen et al. ....... 707/100 |
| 6,665,658 B1 | 12/2003 | DeCosta et al. |
| 6,684,369 B1 | 1/2004 | Bernardo et al. |
| 6,694,436 B1 | 2/2004 | Audebert |
| 6,760,711 B1 | 7/2004 | Gillett et al. |
| 6,795,830 B1 * | 9/2004 | Banerjee et al. ............. 707/200 |
| 6,839,747 B1 | 1/2005 | Blumenau et al. |
| 6,879,995 B1 | 4/2005 | Chinta et al. |
| 6,895,430 B1 | 5/2005 | Schneider |
| 7,000,028 B1 | 2/2006 | Broadhurst et al. |
| 7,152,207 B1 | 12/2006 | Underwood et al. |
| 2002/0046083 A1 | 4/2002 | Ondeck |
| 2003/0105672 A1 | 6/2003 | Epstein et al. |
| 2006/0074970 A1 * | 4/2006 | Narayanan et al. .......... 707/102 |

OTHER PUBLICATIONS

Kimberly Keeton et al. "Performance Characterization of a Quad Pentium Pro SMP Using OLTP Workloads",in: Computer Architecture, 1998. Proceedings. The 25th Annual In Symposium, 1998, pp. 15-26.*

Ashraf Aboulnaga et al, "Deploying Database Appliances in the Cloud", copyright 2009, IEEE computer society, pp. 1-8.*

Daniel N. Mall, "A Case Study in Optimization",Proceedings of the International Conference on Software Maintenance (ICSM'03), 2003, 10 pages.*

European Patent Office, "Communication Pursuant to Article 94(3) EPC", application No. 00907041.8-1527, dated Mar. 5, 2008, 6 pages.

Claims, application No. 00907041.8-1527, 4 pages.

Bershad, et al., "SPIN—An Extensible Microkernal for Application specific Operating System Services", Operating Systems Review, vol. 29, No. 1, Jan. 1995, XP-000881244, 4 pages.

* cited by examiner

PRE-DEFINED HARDWARE AND SOFTWARE BUNDLE READY FOR DATABASE APPLICATIONS

RELATED APPLICATIONS

This application is a divisional application of U.S. patent application Ser. No. 10/762,949, filed on Jan. 21, 2004, entitled "Pre-defined Hardware and Software Bundle Ready for Database Applications," the contents of which is incorporated herein by reference in its entirety, which itself is a continuation of U.S. patent application Ser. No. 09/945,135, filed on Aug. 31, 2001, now U.S. Pat. No. 6,988,102, entitled "Techniques for Managing Configuration for a System of Devices Arranged in a Network", the contents of which is incorporated herein by reference in its entirety, which itself is a divisional application of Ser. No. 09/240,299, now U.S. Pat. No. 6,487,547, filed on Jan. 29, 1999, entitled "Pre-Defined Hardware And Software Bundle Ready For Database Application", the contents of which is incorporated herein by reference in its entirety.

FIELD OF THE INVENTION

The present invention relates to database systems and, more particularly, to reducing the total cost associated with maintaining one or more database systems.

BACKGROUND OF THE INVENTION

Inevitably, companies that invest in computer systems discover that the cost of owning a computer system is far greater than the price of the initial hardware and software purchases. Even relatively small computer systems, consisting of a handful of workstations networked together, frequently encounter problems that can consume an exorbitant amount of time and money. To prevent such problems, and to address such problems when they occur, many companies hire full time information service (IS) professionals. Frequently, the size of a company's in-house IS department grows until it consumes a disproportionate amount of the company's resources and profits.

The magnitude of the expenses associated with maintaining a computer system is due in part to the fact that most computer systems are composed of numerous layers of general purpose components, even though the actual use of all layers is directed to a single specific application. For example, a company may purchase a computer system for the sole purpose of handling the company's accounting. However, the actual workstations purchased for this purpose will typically be general purpose machines that provide all of the hardware services required to be able to handle any application. Many of these services are completely irrelevant for the actual use to which the machine will be directed. For example, the machines may come equipped with built-in "three-dimensional" sound capabilities that will never be utilized while the machines are used for accounting.

The general purpose machines that are to implement the accounting system will typically come installed with a general purpose operating system. Similar to general purpose hardware, general purpose operating systems attempt to provide services to address all possible needs of all possible types of software. For example, general purpose operating systems employ complex I/O techniques for handling I/O intensive applications, complex techniques to support computation intensive applications, and complex communication techniques to support communication intensive applications. Many of those services may not be required by the specific context, such as accounting, in which the operating system may actually be used.

Typically, the hardware and operating system would not be the only "general purpose" components that would be used to implement an accounting system. For example, the accounting system may be configured to interact with a database system. Typically, the database system would provide services to address all possible uses of the database system, and not just those required by the accounting program. Given the diverse environments in which database systems may be used, the services actually required by any given application may be a small fraction of all the services provided by the database system.

In the accounting example given above, each of the general purpose components tends to be complex and, consequentially, difficult to manage. When many of such components are thrown together in a single system, the complexity increases exponentially, thus necessitating the significant after-the-purchase computer system maintenance expenses that most companies have encountered.

In the context of database systems, the complexity of the general purpose database system combined with the complexity of the general purpose operating system with which the database system interacts is typically sufficient to require employment of a full-time database administrator (DBA). It is the responsibility of the DBA to grapple with the complexity of the database system, the operating system, and the interactions between them, so that the other database users can take advantage of the database system without being exposed to underlying complexity. Unfortunately, employing a full-time DBA makes ownership of a useful database system an expensive option.

Based on the foregoing, it is clearly desirable to provide a computer system that employs features that reduce the cost of maintaining the database system without having a negative impact on the ability of the computer system to perform its intended purpose. It is further desirable to decrease the complexity of computer systems, and to provide management techniques that allow companies to reduce the size and cost of their in-house IS departments.

SUMMARY OF THE INVENTION

A database system that incorporates numerous features that reduce the total cost of maintaining the database system is provided. That database system includes a database appliance that executes a database server on a platform that includes a special purpose operating system specifically tailored to the services required by the database server. According to certain aspects, the hardware may also be specially tailored to the services required by the database server. According to one aspect of the invention, the database sever may be generated from another database server by modifying the code of the other database server optimize the code for execution on said database appliance.

According to another aspect, the database appliance includes an operating system and a database server generated from another database server by modifying the code of the other database server optimize the code for execution on said database appliance. The operating system may be a special purpose operating system whose code has been optimized for use as part of the database appliance.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Techniques are described herein for providing a database system with reduced exposed complexity, reduced maintenance costs, and simplified management are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

A system that incorporates numerous features that reduce the total cost of maintaining the database system is provided. The system includes, among other things, one or more "database appliances". A database appliance is a machine that includes database server software and non-database server software, where the non-database software is specially tailored to the needs of the database server. Such non-database software may include, for example, operating system software from which have been removed services that are typically used in general purpose computers but are not required to support the needs of the database server. According to one embodiment, even the hardware of the machine deviates from a general purpose computer in order to more efficiently support specific characteristics and requirements of the database server.

The total cost of database system maintenance is further reduced by providing an integrated management console which, according to one embodiment, is located outside the local network in which the database system resides. The integrated management console manages all functional components (including hardware and software) of the database appliances. The maintenance costs of the database system are further reduced by having a single "outside consultant" administrator use the integrated management console to manage the database appliances of numerous companies, thus avoiding the need for those companies to each employ their own expert database administrator.

Exemplary System

Figure 1A:
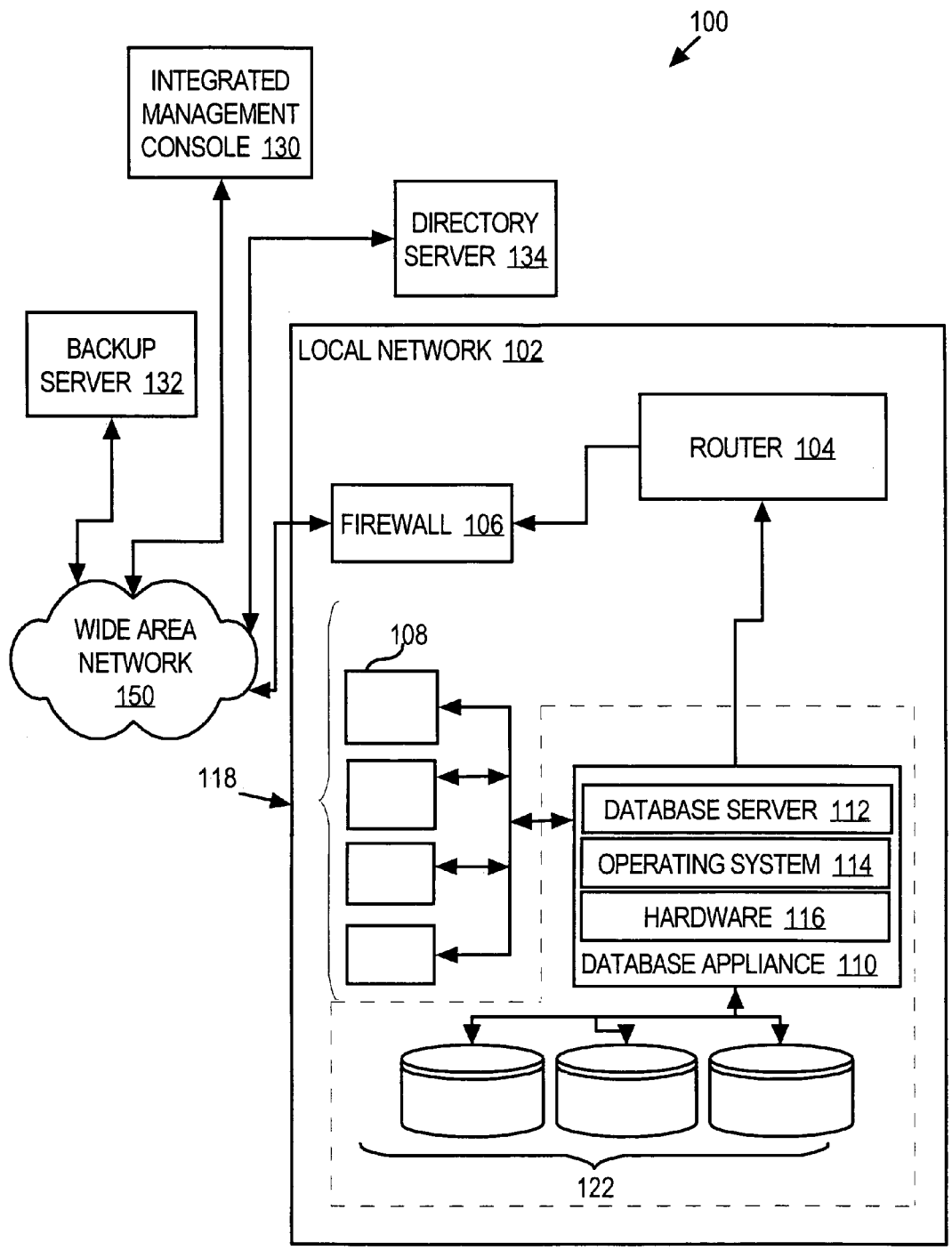
FIG. 1A is a block diagram that shows a system that implements an embodiment of the present invention.

Referring to FIG. 1A, it is a block diagram of a system 100 configured according to an embodiment of the present invention. System 100 includes local area network 102 that is connected to a wide area network 150 through a firewall 106. In a typical configuration, local area network 102 is a network installed at and owned by a particular company, and wide area network 150 is the Internet.

Within local area network 102, a database appliance 110 is connected to a set of storage devices 122 and to one or more database clients. Storage devices 122 are shown external to database appliance 110, but may alternatively be integrated in database appliance 110 itself. As used herein, the term "client" refers to a system or component that may reside either outside of appliance 110 (e.g. on workstation 108 in FIG. 1A) or within the appliance 110. In the context of database systems, the client of a database server is typically referred to as a database application.

The local network 102 includes a router 104 that routes messages between remote devices on the wide area network 150 and the various components on the local network 102. In particular, system 100 includes an integrated management console 130, a directory server 134 and a backup server 132, all of which can communicate with each other and with the components of local network 102 through wide area network 150.

System 100 incorporates numerous features that reduce the cost of maintaining local network 102 for the company that owns local network 102. Each of the features shall now be described in greater detail.

Figure 1B:
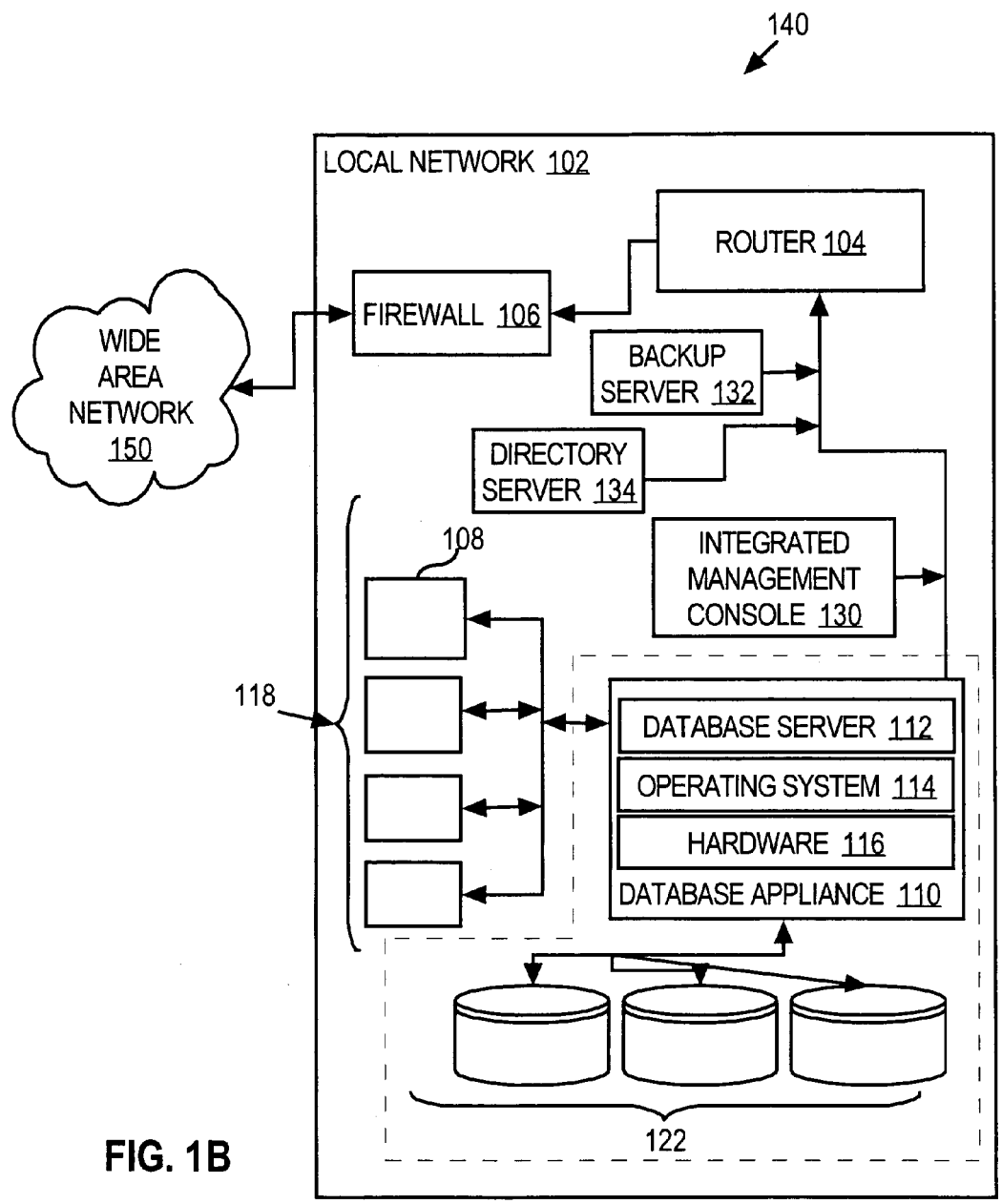
FIG. 1B is a block diagram that shows alternative configuration for a system that implements an embodiment of the present invention.
Figure 1C:
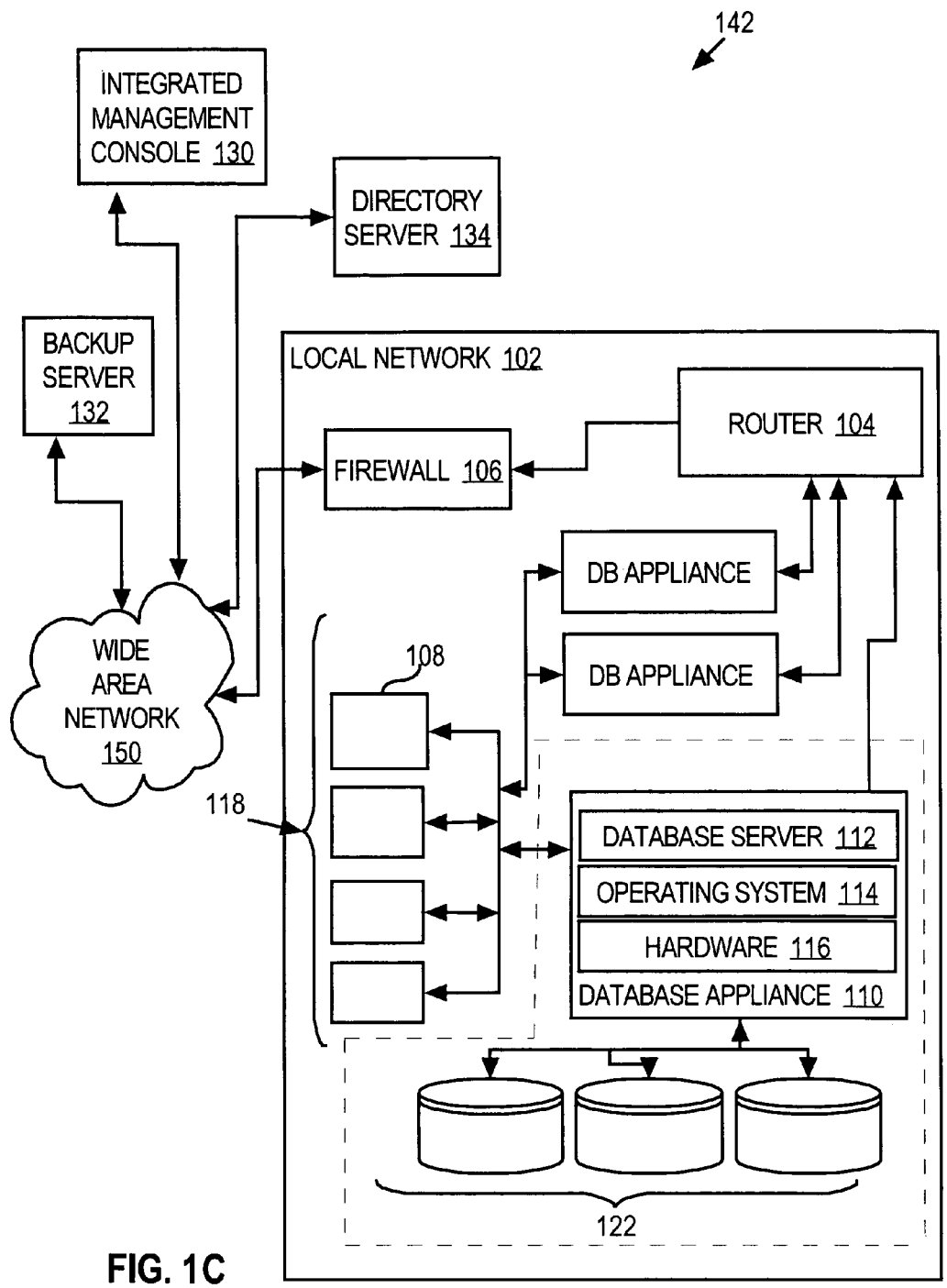
FIG. 1C is a block diagram that shows alternative configuration for a system that implements an embodiment of the present invention.
Figure 1D:
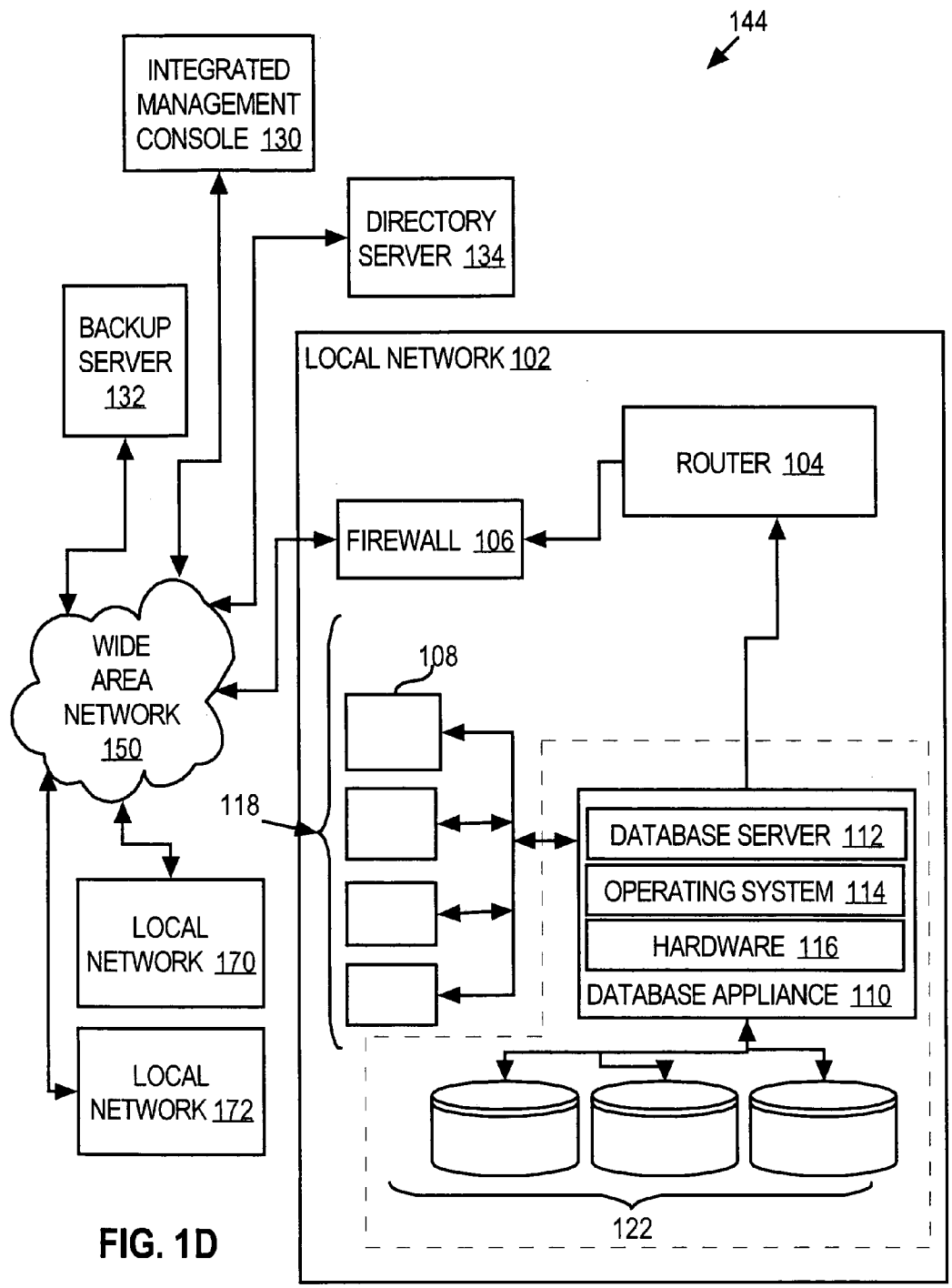
FIG. 1D is a block diagram that shows alternative configuration for a system that implements an embodiment of the present invention.

The arrangement and content of system 100 is merely exemplary. The specific arrangement and content of a system that implements the features of the present invention will vary from implementation to implementation, depending on the specific needs of the user. FIGS. 1B-1D, for example, illustrate alternative configurations. The system 140 shown in FIG. 1B has the backup server 132, directory server 134, and integrated management console 130 all within the local network. The system 142 of FIG. 1C includes numerous database appliances. The system 144 of FIG. 1D includes numerous local networks 170 and 172 that can be managed through the same integrated management console 130 as is used to manage local network 102.

Database Appliance

Database appliance 110 is a machine configured to execute a database server 112. Similar to conventional database implementations, database appliance 110 includes a database server 112 and operating system 114 executing on hardware 116. However, unlike conventional database implementations, the operating system 114 executing on database appliance 110 is a special purpose operating system tailored specifically for executing database server 112. As a special purpose operating system, operating system 114 does not possess the high number and complexity of services that general purpose operating systems employ. The nature and techniques for generating operating system 114 shall be discussed in greater detail hereafter.

According to one embodiment of the invention, hardware 116 is also specifically tailored for executing database server 112. The cache hit ratio experienced by the database appliance 110 may be improved by a special configuration of the hardware. Specifically, at the hardware level, the operating system level, the database server level, and possibly at the database application level, data is moved between the levels by copying the data from one place in memory to another. In a general purpose computer system, each layer will typically use different buffers for storing and copying the data, and different algorithms for determining which data should be stored in its buffers. In contrast, according to one embodiment of the invention, from the database server level to the level of the microchips in hardware 116, the same algorithm is used for determining which data is to be cached.

Generating a Special Purpose Operating System

Various techniques may be employed to generate an operating system 114 specifically tailored to execute database server 112. In general, the generation of operating system 114 may involve initially writing a special purpose operating system based on the needs of database server 112, or modifying an existing general purpose operating system to create operating system 114. In either case, a first step in the generation of operating system 114 is determining the services needed by database server 112.

According to one embodiment, the source code of database server 112 is examined to identify calls made to operating system functions. The operating system calls thus identified are considered calls to "required services". After the required services are identified, operating system 114 is generated to provide specific support of those required services.

In an embodiment that generates operating system 114 by modifying an existing general purpose operating system, operating system 114 may be generated by (1) removing operating system code that corresponds to services that are not required services, (2) tuning the parameters and configuration of required services to achieve better performance, and (3) modifying the code that implements required services to enhance their efficiency relative to their use by database server 112.

According to one embodiment of the invention, operating system 114 does not provide services directly to end users. For example, in an embodiment where operating system 114 is generated by modifying an existing general purpose operating system, one of the modifications made to generate operating system 114 involves removing from the general purpose operating system all routines that provide an interface through which an end user can directly access the operating system. Thus, an end user may cause changes to be made to the file system on disks 122 in response to interaction with database server 112, but not through direct calls to the file system services of operating system 114.

In many operating systems, operating system services are provided by both service modules and by an operating system "kernel", where the service modules execute in their own address space separate from the kernel. The kernel of operating systems that rely heavily on user-space modules to provide services is commonly referred to as a microkernel. Special purpose operating system 114 may be generated by modifying a general purpose operating system that employs a single monolithic kernel, or by modifying a general purpose operating system that employs a microkernel and associated service module.

The following techniques apply to both operating systems that do and do not employ a microkernel. Modifying the general purpose operating system may involve performing the above-listed steps of removing extraneous code, tuning parameters, and enhancing code at both the service module level and at the kernel level. In some cases, entire service modules may be removed when the services they provide are not required by the database server 112. For example, a general purpose UNIX operating system may have the following service modules:

NFS Daemon—Network File System I/O Server.

Printer Daemon—Print spooling service provider.

FTP Daemon—File Transfer Protocol Server, provider of file transfer protocol services.

INET Daemon—A listener listening in specific Internet sockets for connections. Based on requests, the INET Daemon starts services to service the requests. For example, the INET Daemon listens for "bootp" requests and starts a "bootp daemon" upon receiving a bootp request.

Time Daemon—Time keeper to synchronize host's time with other machines in the network.

HTTP Daemon—A web server.

PPP Daemon—Dial up daemon that provides dial-up support.

Mount Daemon—The Network File System Mount Request Server.

Swapper Daemon—A system process that is invoked when free memory falls below a minimum. The swapper daemon scans an "inactive_pagelist" and marks pages to be swapped out, based on some replacement technique.

Flush Daemon—A system process that flushes the dirty buffers of a buffer cache back to the file system.

Telnet Daemon—A service that provides an interactive session with the host to external clients.

Many of these service modules provide services that are not required by database server 112. Operating system 114 is generated, in part, by removing from the general purpose operating system those unused service modules. In the context of database appliance 110, the modules that are removed from the general purpose operating system to generate operating system 114 may include, for example: the NFS Daemon, the FTP Daemon, the Mount Daemon, and the Telnet Daemon.

In embodiments that generate operating system 114 by modifying an existing general purpose operating system, the identification of the services to be optimized may alternatively or additionally be performed using a kernel trace. While database server 112 is being used, a code trace is performed by tracking the thread of execution. When database server 112 requires services from the operating system, the database server code will call portions of operating system 114, causing those portions to be identified in the thread of execution. After the trace is performed, the services provided by those portions of the operating system that are identified in the trace are considered good candidates for optimization. For example, if the trace shows that a particular operating system routine was invoke one hundred times more than other operating system routines that were invoked during the same time period, the frequently invoked routine may be selected as a candidate for optimization. The kernel trace may even provide hints with respect to how those portions should be optimized.

Enhancing and Tuning Required Services

In addition to discarding operating services that are not required by a particular application, generating an application-tailored operating system may also involve enhancing those operating system services that are required. For example, assume that an operating system is to be generated for an appliance that is to operate as an Internet file server. Further assume that the file server is to store articles about the daily news. Due to the nature of the application, the appliance may be accessed through thousands of concurrent connections. Further, most of those connections will involve requests for the same material. A high number of buffers is required to support that number of connections, but once the heavily-accessed material is loaded into the buffers, very little disk access will be required.

Under these conditions, if the operating system is not specially tailored for such access, the operating system may allocate fewer buffers than are required to store the entire amount of heavily accessed material. Consequently, the buffers may be overwritten with such frequency that it becomes difficult for any user to interact efficiently with the appliance. A specially tailored Internet file server application, on the other hand, may include a database that dedicates relatively fewer resources to efficiently retrieve the material, and relatively more resources for storing the heavily accessed material once it has been retrieved. Consequently, buffered portions of the heavily accessed material will not have to be overwritten to load in other portions of the heavily accessed material, since enough buffers have been allocated to store the entire set of heavily access material. Because portions of the heavily accessed material are not being overwritten, those portions do not have to be retrieved again from disk when subsequently requested. Ironically, by reducing the resources used for disk retrieval, the efficiency of disk retrieval can actually be improved because fewer disk accesses will be required.

The shifting of resources from disk retrieval to cache storage is an example of an enhancement that may be performed by tuning the configuration and parameters of the services involved, as opposed to actually modifying the code of the underlying services. Such tuning techniques may be used instead of, or in addition to, actual code optimizations of critical required services. Actual code modifications may involve, for example, causing operating system 114 to store resource information in a way that allows it to be directly read by database server 112 without causing a context switch to the operating system kernel address space, and causing database server 112 to read the resource information directly rather than by performing system calls through the system call interface of the operating system.

In the context of OLTP database applications, much of the workload of database appliance 110 will involve I/O. Specifically, the workload of database appliance 110 is largely retrieving information from tables stored on non-volatile storage devices 122, caching the information that is used frequently, and supplying that information to database application workstations 118 over the local network 102. In general, the actual computational demands on database appliance 110 will be minimal, such as calculating the balance of a bank account. Therefore, when the anticipated application of database appliance 110 is as a server to OLTP applications, the process of enhancing certain required services would typically involve enhancing or dedicating relatively more resources to the operating system services responsible for disk and network I/O. In many commercially available operating systems, the services that handle disk I/O are referred to as Async I/O, Direct I/O, raw device access, and striping.

One technique for optimizing required services involves, for selected operations, bypassing certain layers that would normally be involved in those operations in a general purpose machine. Typically, such layers are provided in general purpose operating systems, for example, to give a virtual common interface. Though convenient, the overhead required to provide a virtual common interface negatively impacts performance. The database appliance may be optimized to bypass unwanted layers, thereby reducing overhead.

In trying to solve all problems for all situations, general purpose components frequently do not provide the optimal solution for a particular problem. For example, in a general purpose operating system, the allocation of resources (e.g. the CPU and memory) is performed so that all consumers are given a fair share of the resource. However, within a database appliance designed according to an embodiment of the invention, the processes that will be executing are generally known. Therefore, one technique for optimizing required services involves designing the operating system to allocate resources to the known processes in a manner that best improves performance of the appliance. The conditions and demands of various processes do not remain the same throughout the life of the processes. Therefore, according to one embodiment, an adaptive resource manager is provided to get the appliance to perform optimally, even when the load conditions and demands change.

Allocating a certain percentage of CPU time to a process is different than allocating to the process CPU time when the process needs it. According to one embodiment, the scheduling techniques of the special purpose operating system are based on shares of CPU time, as allotted by the adaptive resource manager. The adaptive resource manager allots CPU shares and process priority based on the changing resource demands of the process. The parameters used by the adaptive resource manager can be set by an administrator, or be automatically determined based on historical information maintained about the processes.

Database Application Specific Database Appliances

In addition to tailoring the operating system 114 and the hardware 116 of a database appliance 110 to a particular database server 112, database server 112 itself along with the operating system 114 and the hardware 116 may be more particularly tailored to a particular database application. For example, one type of database application, referred to as an online transaction processing (OLTP) application, is relatively I/O intensive, while another type of database application, referred to as an online analytical processing (OLAP) application, is relatively computationally intensive. Consequently, at each level, the database appliance configured for use with an OLTP application is adapted to enhance I/O performance of database server 112, while the database appliance configured for use with an OLAP application is adapted to enhance computation performance.

Self-Configuring Database System

When a company purchases a new system, such as local network 102, the company typically pays a third party to "install" the system. The process of installing even smaller systems may involve a significant expenditure of time and money, in part because each of the complex general purpose of the components need to be configured to interact accurately with each of the other complex general purpose components on the system.

According to an embodiment of the invention, database appliance 110 includes self-configuration software that avoids the need to hire installation experts. When executed, the self-configuration software detects the environment in which database appliance 110 is being used, and configures database appliance 110 according to the detected environment. For example, the same bundle of database appliance software is sold to a first company that will have a database cache of 200 megabytes and have a 10 gigabyte database, and to a second company that will have a database cache of 32 megabytes and a 500 megabyte database. The first company executes the database appliance software in a system that includes significantly more resources than the second company. In response to detecting the resources available in the first company's system, the database appliance configures itself to support a 200 megabyte database cache and a 10 gigabyte database. Similarly, upon detecting the resources available at the second company, the database appliance configures itself to support a 32 megabyte database cache and a 500 megabyte database.

According to one embodiment, the self-configuration includes adjusting parameters that affect both the configuration and operation of database server 112, and the configuration and operation of operating system 114. Optionally, the self-configuration software further adjust parameters that affect the operation of the hardware 116 used by the database appliance 110.

FIGS. 4A-4D collectively depict a flowchart illustrating steps for installing the bundle of appliance software on a machine to create a database appliance. According to one embodiment, the installation process is a "1-button" process in that it completes all operations without needing any human intervention during the process. Further, the appliance software bundle does not simply install on the machine, but rather it configures the system in such a way that when booted up, the system starts up all needed services, and is ready to be used to run database applications. Additionally, the installation process detects what hardware is present, and auto configures to allow it to be entirely dedicated to run the database and related programs only. If the system has to be upgraded or recovered from a system disk failure, the same 1-button process is used to upgrade or recover the appliance.

Referring to FIGS. 4A-4D, in step 400 the appliance is booted from a removable storage medium, such as a CD ROM or floppy disk, the CD ROM is mounted and a memory file system (MFS) is created. The MFS is a file system created in the volatile memory of the machine. It is used as a temporary work area until the non-volatile disks are formatted. In step 402, a search is performed for the devices that are required by the software being installed. In step 404, it is determined whether any required device is absent. If any required device is absent, control flows from step 404 to step 406 and the installation operation is terminated.

If all of the required devices are present, control passes from step 404 to step 408. At step 408, it is determined whether the Dynamic Host Control Protocol Daemon (DHCPD) specifies any site specific information. In particular, a DHCP client broadcasts packets for a DHCP daemon on the same subnet. The DHCPD then responds with network parameters, as well as other site-specific parameters. If site specific information exists, control passes from step 408 to step 12. Otherwise, control passes from step 408 to step 410.

At step 410, it is determined whether there is any site specific information specified on the installation floppy disk. If the installation floppy disk does contain site specific information, control passes to step 412. Otherwise, control passes to step 416.

At step 412, a SITE-SPECIFIC flag is marked as "done". Control flows from step 412 to step 414, where the site specific information is parsed. Control passes from step 414 to step 416.

At step 416, it is determined whether an installation already exists on the appliance. If an installation already exists, control passes to step 424. Otherwise, control passes to step 418. At step 424, the setup procedures for an upgrade operation are performed, and control passes to step 428. If there is no existing installation, at step 418, it is determined whether recovery is being performed from a CD ROM. If recovery is being performed, control passes to step 420. Otherwise, control passes to step 426.

At step 420, recovery of distribution is performed from the recovery CD ROM. Specifically, when the system disk fails, the appliance cannot boot up unless a new disk is substituted for the failed disk, and the distribution and data on the failed disk are reconstructed. Database data on the system disk is backed up to its pair disk. However, the distribution is obtained from the install CD ROM. The system boots from the CD ROM, automatically determines that it is involved in a recovery from the CD, formats the new disk, recovers the distribution from the CD, and recovers data from backup. Control passes from step 420 to step 422 where the installation process is terminated.

At step 426, the storage devices of the appliance are partitioned and labeled, and file systems are created thereon. At this point, the installation software ceases to use the MFS for temporary storage, and begins to use portions of the appliance's persistent storage or temporary storage. Control passes from step 426 to step 428.

At step 428, a windows manager (e.g. X) is started. If no display device is present on the appliance, then the windows manager is started in "quiet mode" using a virtual frame buffer. Control passes from step 428 to step 430. In step 430, the environment for the installation software is set, and the installation software is started. Control then flows from step 430 to step 432.

At step 432, it is determined whether the SITE-SPECIFIC flag is set to "done". If the flag is set to done, then control passes to step 436. Otherwise control passes to step 434. At step 434, install scripts that are related to the site-specific parameters are copied to the persistent storage of the appliance. These install scripts are preferable run when the appliance is rebooted when the site-specific parameters are available. Control then passes to step 436.

At step 436, the install software installs the operating system and site specific configuration parameters for the operating system. Control then passes to step 438 where the installation software installs the database server along with the site specific configuration parameters for the database server. Control then passes to step 440.

At step 440, the installation software installs web server software along with site specific configuration parameters for the web server. Control then passes to step 442.

At step 442, the install software installs web database software and site specific configuration parameters for the web database software. The web database software is a software module that translates web requests into database requests. For example, the web requests may arrive according to HTTP protocol, and be converted by the web database software to conform to the database language used by the database server employed by the appliance (e.g. SQL or PL/SQL). Control then passes to step 444. At step 444, backup, recovery, and scaling boot scripts are generated. These scripts enable automatic backup or recovery, as well as providing means to expand the system when additional hardware is included. Control then passes to step 446, where other boot/cron/admin scripts are generated. The boot scripts dictate the steps performed on boot up to get the system up and running without manual intervention. The cron scripts run periodic jobs to do system management tasks. For example, they may be configured to automatically run processes for a remote administrator in the even of a crash. The admin scripts perform management tasks in response to events and/or commands from the remote console. Control then passes to step 448 where an initial backup is performed, and at step 450 the installation process is terminated.

Integrated Management Console

Integrated management console 130 is one of the many feature of system 100 that reduce the total cost of ownership of the database system implemented on the local network 102. Integrated management console 130 deviates significantly from prior approaches to system management in that it integrates management of the database appliance 110 at numerous levels, including two or more of the database application level, the database server level, the operating system level, and the hardware level.

According to the prior approaches, each of those levels represented a separate general-purpose product, where each of the general purpose products is typically provided by a different source. Each of the different sources would provide separate management software for its own general purpose product. Consequently, systems would typically include one console running management software from one source for managing a database server, another console running management software from another source for managing an operating system, and yet another console running management software from another source for managing the hardware. Typically, each management package would itself be complex, due to the inevitable complexity of the general purpose product that they are intended to manage. Further, because the management console for each component was provided by a different source, the consoles would not share a common user interface or management model, thereby significantly increasing the cost of management.

The integrated management console 130 is a console through which numerous aspects of the database system on local area network 102 can be remotely managed. Specifically, the company that owns local area network 102 need not have its own in-house department of database and system administrators. Rather, a third party consultant is able to efficiently manage the company's database system remotely. In fact, the same third party consultant is able to manage the database systems of numerous companies in the same manner and through the same integrated management console. Consequently, the cost of the consultant's work can be shared among the many companies.

Integrated management console 130 allows an administrator to remotely manage database server appliances, both at the database server level and at the operating system level. In embodiments where the database application itself is also located on the database appliance 110, the database application is also managed through the integrated management console 130.

Optionally, integrated management console 130 is also used to manage database appliance 110 at the hardware level. For example, hardware 116 may include a redundant array of inexpensive disks (RAID) subsystem whose operational parameters and configuration can be managed through integrated management console 130.

Because the numerous aspects of the database appliance 110 are managed through the same console that uses a consistent user interface and management model, the management chore is simplified. Further, management of the whole database appliance is significantly less burdensome than management of each of the parts of previous database systems, because each of the parts managed by integrated management console 130 is specifically tailored to the particular context in which the appliance will be used, and lacks the innate complexity of its general purpose counterpart.

According to one embodiment, database appliance 110 includes a simple network management protocol (SNMP) compliant agent and a multi-level management agent. The integrated management console interacts with the SNMP agent using the SNMP protocol. The SNMP agent, in turn, is configured to send commands to the multi-level management agent in response to the messages received from the integrated management console. The multi-level management agent responds to the commands by performing management functions at the various levels of database appliance 110.

In the embodiment illustrated in FIG. 1, the integrated management console 130 connects to and communicates with database appliance 110 through a wide area network 150, such as the Internet. However, according to an alternative embodiment, integrated management console 130 is configured to connect to database appliance 110 through a direct dial-up connection, thus bypassing the need for infrastructure required to connect database appliance 110 to the wide area network 150, and the additional infrastructure required at the other end to connect integrated management console 130 to the wide area network 150. In some embodiments, the direct dial-up connection would still pass through a company's firewall for security reasons.

According to one embodiment of the invention, the integrated management console 130, along with the agent running on the appliance, allows administrators to perform the following operations remotely:

configure and control the operating system and database services,
apply patches and upgrade to a set of appliance servers,
enable lights-out management, and
generate reports of the system resource usage and optimize performance.

With respect to lights-out management, a remote administrator may use the integrated management console 130 to define a set of "events" that may represent some error conditions. The administrator can then associate with each event a "fixit" job to be invoked when the event is triggered. The administrator can also configure the system to raise an alert and send page or e-mails to the administrator on duty in response to certain types of critical alerts. For example, when the disk space containing archive logs is getting full to a definable threshold, an event can be triggered. The event may invoke a job that does a back up of the database and cleans up the archive logs. In response to other events, such as when a node or the network goes down, the system can call attention of the remote administrator by paging the administrator.

Backup Server

Backup server 132 is a server configured to back up critical information that is stored in local network 102. Backup server 132 includes a tape storage, or some other relatively inexpensive high capacity storage medium, for storing the data. The data from local network 102 to be backed up by backup server 132 is communicated to backup server 132 according to a backup schedule that will vary from implementation to implementation. Various mechanisms may be used to convey the data from the devices on which it resides within local network 102 to the remotely located backup server 132, which does not reside on local network 102. According to one embodiment, the data is communicated through the firewall 106 over the wide area network 150 to be backed up on backup server 132. Alternatively, backup server 132 can connect to local network 102 through a non-dedicated connection.

Backup service commands that dictate operational parameters for backup server 132 are, according to one embodiment, issued and controlled through the integrated management console 120. Such commands determine the schedule by which backup server 132 backs up the data of local network 102. For example, integrated management console 130 may program backup server 132 to perform incremental backups nightly, and full backups on a weekly basis.

Because the backup of local network 102 is performed remotely, the company that owns local network 102 does not have to employ an on-site operator to perform the backups. Further, the operator that does perform the backups at the remote site may be a third party that performs such backups for numerous companies, thus spreading the cost among the numerous companies to reduce the cost required by each of the individual companies.

Directory Server

A directory service is a repository for information (metadata) about a system. Communication with the directory service is performed through a protocol supported by the directory service, such as the Lightweight Directory Access Protocol (LDAP). To find out information about a device, a search is performed on the directory service for the system. For example, a device outside of the system may wish to communicate with a device within the system. The device outside the system may only have the name of the device with which it desires to communicate. Using the name, the directory service searches the metadata to determine the address of the named device. The address is returned to the outside device, which is then able to communicate with the inside device using the address.

According to one embodiment of the invention, all of the metadata about local network 102 is stored in a repository within directory server 134, which resides outside of local network 102. The metadata includes, for example, information about how the system within local network 102 is configured, including the configuration of database appliance 110. In systems that include numerous database appliances, the metadata includes one set of configuration parameters that are common to all database appliances, and sets of configuration parameters that are specific to the configuration of each of the individual database appliances. According to one embodiment, a copy of the configuration data from the repository is also stored in a cache on a device within local network 102 to improve the speed at which it may be accessed by devices within local network 102.

Storing the configuration metadata for the components that reside within network 102 in a centralized repository, and locating that repository outside the system itself, provides numerous benefits. One such benefit involves having a centralized point of control for tuning operations. For example, an operator of integrated management console 130 is able to change any of the configuration parameters of network 102 to "tune" the system for better performance by modifying the metadata contained in directory server 134. Such configuration modifications are then propagated from the directory server 134 to the local network 102 to effect the changes.

Another benefit of the centralized repository involves replicating a tuned system. For example, assume that a company has hundreds of retail stores with similar computing needs. One of the stores may have implemented a database system prior to the other stores. Over time the store has customized and tuned its configuration to perform optimally for its intended use. At some point in time, the company may desire to automate all of its stores. Because the one automated store has a central repository that stores its configuration information, that configuration information can be easily inspected and copied to implement identically configured "pre-optimized" systems at the various other stores.

Another benefit involves the recovery from catastrophic failures, which shall be described in greater detail hereafter.

Failure Recovery

Subsystems within company's computer system typically provide their own mechanisms to facilitate recovery from a single point of failure, such as the failure of a disk or a network card. For example, RAID subsystems are designed to automatically correct single disk failures. When a subsystem fails, recovery is slightly more complicated. For example, if an entire RAID subsystem fails, the data stored thereon typically must be recovered from backups.

When a more catastrophic failure occurs, the entire computer system of a company ceases to function. Typically, such failures would also result in the loss of metadata that describes how the system was configured, such as the identity of the devices that belonged to the system, the network parameters that were in effect, the IP addresses that were being used, etc. In conventional computer systems, this information is not gathered in any particular location, but rather disbursed unsystematically among the components to which the configuration information applied. Consequently, recovering after such a failure was extremely difficult and expensive.

For example, if a system similar to the company's system exists, the company's system can be reconfigured based on the similar system, and the data can then be reloaded from backup. However, such a "similar system" may not exist if the company's system has been customized, or may exist but not be know to or controlled by those responsible for recovering the company's system. Further, some configuration information, such as the IP addresses used by the system, may be unique to the system.

In the case of a system failure, significant benefit results from having a centralized repository for the configuration metadata of local network 102, and even further benefit results from having that centralized repository located outside of the system to which it corresponds. Specifically, by maintaining a configuration repository for a computer system, such as local network 102, at a single location within the system, recovery from a catastrophic failure may be accomplished in two relatively inexpensive phases: (1) restore the configuration repository from backup to recover the configuration of the system, and (2) restore the data from backup onto the configured system. If the configuration repository is maintained outside the system itself, as in the embodiment illustrated in FIG. 1, the first phase is even simpler because the repository itself would typically not have to be recovered from backup because it would not be lost in the catastrophic failure.

Figure 3:
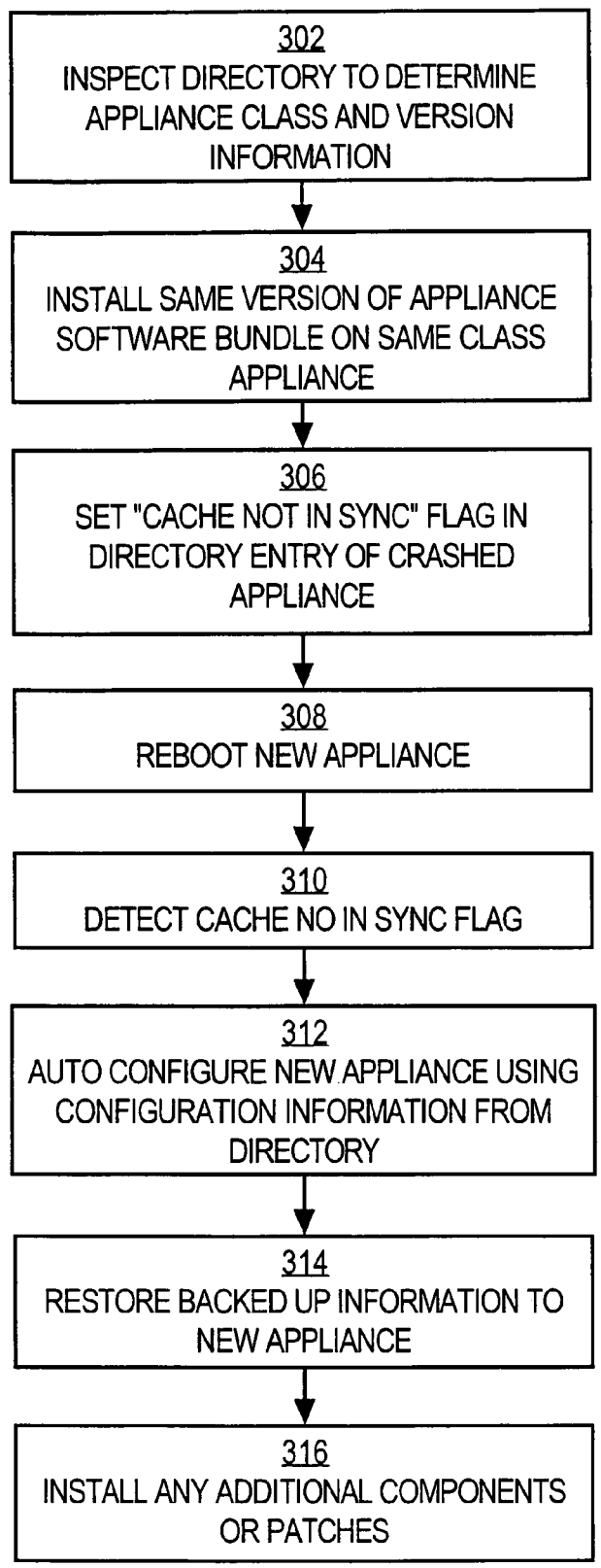
FIG. 3 is a flowchart that illustrates the steps for recovering a database appliance according to an embodiment of the invention.

FIG. 3 is a flowchart of a process for recovering a database appliance from a crash according to an embodiment of the invention. Referring to FIG. 3, at step 302 the integrated management console is used to search the metadata repository maintained by Directory Server 134 for the entry associated with the crashed appliance. According to one embodiment, the directory entry for the crashed appliance includes a unique appliance identifier for the appliance, data that identifies the class of the appliance, and data that indicates the version of the application software bundle that was installed on the crashed appliance.

At step 304, the same version of the appliance software that was installed on the crashed appliance is installed on a new appliance that is of the same class as the crashed appliance. The installation is performed using the appliance identifier of the crashed appliance, thus creating an association between the new appliance and the directory entry of the crashed appliance. At this point, the metadata repository has a valid directory entry associated with the appliance identifier of the crashed appliance, and the new appliance is set up to point to the crashed appliances entry in the metadata repository, even though the configuration of the new appliance is still the default configuration, not that of the crashed appliance.

At step 306, the integrated management console is used to set a flag, referred to herein as the "cache not in sync" flag, in the directory entry of the crashed appliance. At step 308, the new appliance is rebooted. At step 310, the new appliance checks its associated directory entry, which was the directory entry of the crashed appliance, and detects that the cache not in sync flag is set. In response to detecting this flag, at step 312 the new appliance performs auto-configuration by configuring itself to reflect the configuration information in its directory entry.

At this point, the integrated management console may be used to identify the backup solution used by the crashed appliance, and to initiate a restore operation to restore to the new appliance the information that was backed up from the crashed appliance (step 314). At step 316, any additional components or patches that had been installed on the crashed appliance are installed on the new appliance. The console administrator could initiate the applying of patches and install of additional components by browsing the crashed appliance's software component list in the metadata repository.

Hardware Overview

Figure 2:
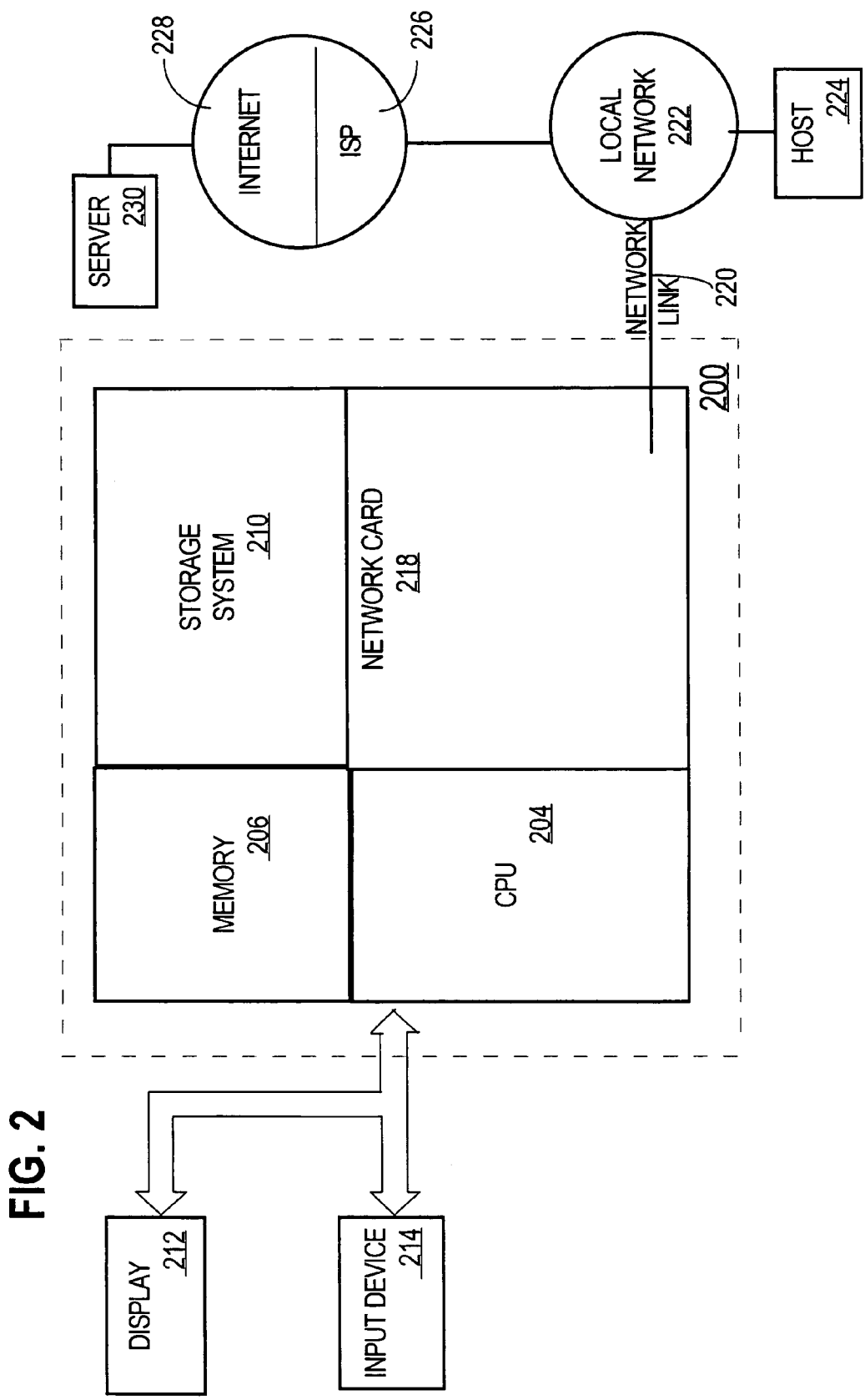
FIG. 2 is a block diagram of a machine that may be used to implement a database appliance according to an embodiment of the invention.

FIG. 2 is a block diagram that illustrates a computer system 200 upon which an embodiment of the invention may be implemented. Computer system 200 includes a CPU 204 for processing information. Computer system 200 also includes a memory 206, such as a random access memory (RAM) or other dynamic storage device, and a storage system 210, such as a magnetic disk or optical disk. Alternatively, storage system 210 may be located outside of computer system 200, and may be accessed by computer system 200 over the network via a standard network protocol, such as NFS. Additionally, EEPROM modules or variants, such as NVRAM, store instructions and data used to help bring the system up.

Other embodiments of the invention may use a computer system with built in controllers on the motherboard to enable tighter integration of the hardware components to achieve better performance. In such an embodiment, the system is scaled by clustering multiple integrated units.

The computer system can be expanded or scaled up with the addition of processors, memory modules, or storage units. When this occurs, the software adaptively configures itself to enable use of added components by the appliance.

Computer system 200 may be coupled to a display 212 for displaying information to a computer user. Display 212 may be, for example, a conventional computer monitor or merely a simple array of LEDs configured to convey status information. An input device 214 may be provided to allow direct input into computer system 200, in addition to input communicated through the network. Input device 214 may be a simple keypad, and/or may involve more sophisticated input mechanisms, such as a keyboard or mouse.

The invention is related to the use of computer system 200 as or in conjunction with a database appliance. According to one embodiment of the invention, a database appliance is implemented on computer system 200 in response to CPU 204 executing one or more sequences of one or more instructions contained in memory 206, where the instructions include a database server and a special purpose operating system adapted to specifically provide the services of the database server and not all of the services required of a general purpose operating system.

Instructions may be read into memory 206 from another computer-readable medium, such as storage system 210. Execution of the sequences of instructions contained in memory 206 causes CPU 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to CPU 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Computer system 200 also includes a network card 218. Network card 218 provides a two-way data communication coupling to a network link 220 that is connected to a local network 222. Network card 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through network card 218, which carry the digital data to and from computer system 200, are exemplary forms of carrier waves transporting the information.

Computer system 200 can send messages and receive data, including program code, through the network(s), network link 220 and network card 218. In the Internet example, a server 230 might transmit a requested code for an application program through Internet 228, ISP 226, local network 222 and network card 218.

The received code may be executed by CPU 204 as it is received, and/or stored in storage device 210, or other nonvolatile storage for later execution. In this manner, computer system 200 may obtain application code in the form of a carrier wave.

While various techniques for reducing the cost of maintaining a computer system have been described above in the context of a database system, they need not be limited to any particular context. For example, rather than have a database appliance 110, a computer system may include a mail server appliance for handling electronic mail. Such a server would include, for example, e-mail server software, where the appliance levels below the server software (i.e. possibly a database system, an operating system, and hardware) are specifically tailored to the needs of the e-mail server software.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A database appliance, comprising:
   one or more processors;
   one or more storage devices operatively coupled to the one or more processors;
   an operating system; and
   a modified database server generated from another database server by modifying the code of the other database server,
   wherein the modified database server is a database server that was produced from the other database server by:
      determining whether the database appliance is for use in conjunction with an online transaction processing (OLTP) application or an online analytical processing (OLAP) application;
      if the database appliance is for use in conjunction with an OLTP application, then the other database server is optimized for I/O performance to produce the modified database server;
      if the database appliance is for use in conjunction with an OLAP application, then the other database server is optimized for computation performance to produce the modified database server;
   wherein the modified database server obtains services of the operating system by making calls to the operating system during execution of the modified database server; and
   wherein the database appliance allocates a CPU share for a process and assigns a priority to the process based on the changing resource demands associated with the process.

2. The database appliance of claim 1, wherein the operating system is a special purpose operation system whose code has been optimized for use as part of the database appliance.

3. The database appliance of claim 1, further comprising:
   a self-configuration module that is capable of performing the steps of:
      detecting an environment in which the database appliance is being used; and
      configuring the database appliance based upon the detected environment.

4. A method for constructing a database appliance, comprising:
   producing a modified database server from another database server;
   wherein producing the modified database server includes:
      determining whether the database appliance is for use in conjunction with an online transaction processing (OLTP) application or an online analytical processing (OLAP) application;
      if the database appliance is for use in conjunction with an OLTP application, then optimizing the other database server for I/O performance to produce the modified database server;
      if the database appliance is for use in conjunction with an OLAP application, then optimizing the other database server for computation performance to produce the modified database server;
   installing on a volatile or non-volatile medium accessible to one or more processors an operating system; and
   installing on the volatile or non-volatile medium the modified database server,
   wherein the modified database server obtains services of the operating system by making calls to the operating system during execution of the modified database server; and
   wherein the database appliance allocates a CPU share for a process and assigns a priority to the process based on the changing resource demands associated with the process.

5. The method of claim 4, wherein the operating system is a special purpose operation system whose code has been optimized for use as part of said database appliance.

6. The method of claim 4, wherein the method further comprises:
   installing on the volatile or non-volatile medium a self-configuration module that is capable of performing the steps of:
      detecting an environment in which the database appliance is being used; and
      configuring the database appliance based upon the detected environment.

* * * * *

UNITED STATES PATENT AND TRADEMARK OFFICE
CERTIFICATE OF CORRECTION

PATENT NO. : 7,610,268 B2 Page 1 of 1
APPLICATION NO. : 11/211118
DATED : October 27, 2009
INVENTOR(S) : Jay Rossiter et al.

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 364 days.

should read (*) Notice: Subject to any disclaimer, the term of this patent is extended or adjusted under 35 U.S.C. 154(b) by 709 days.

On page 2, in column 2, under "Other Publications", line 14, delete "Microkernal" and insert -- Microkernel --, therefor.

Figure 4A:
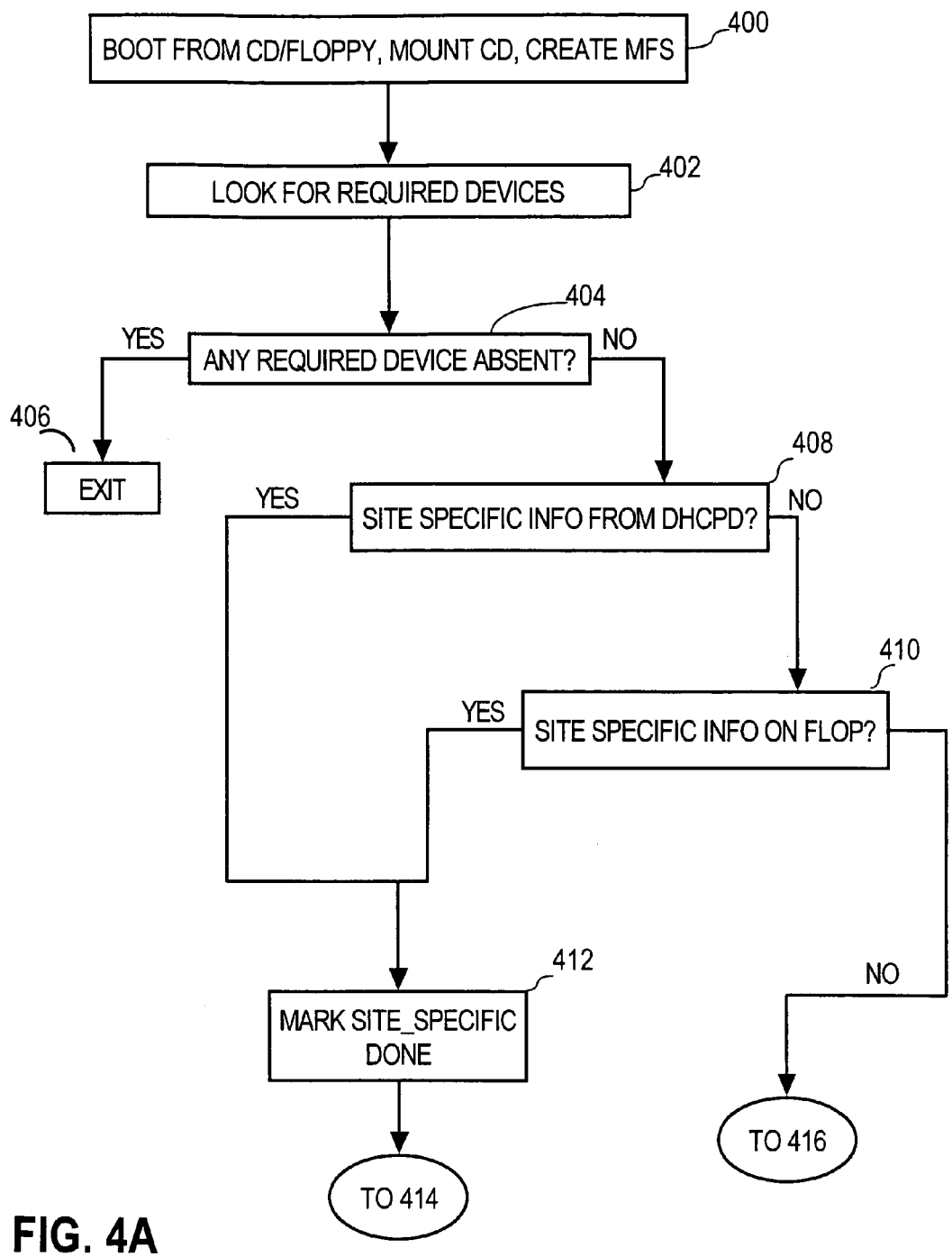
FIGS. 4A, 4B, 4C, and 4D collectively depict a flowchart that illustrates the steps for installing a database appliance software bundle on a machine to create a database appliance according to an embodiment of the invention.
Figure 4B:
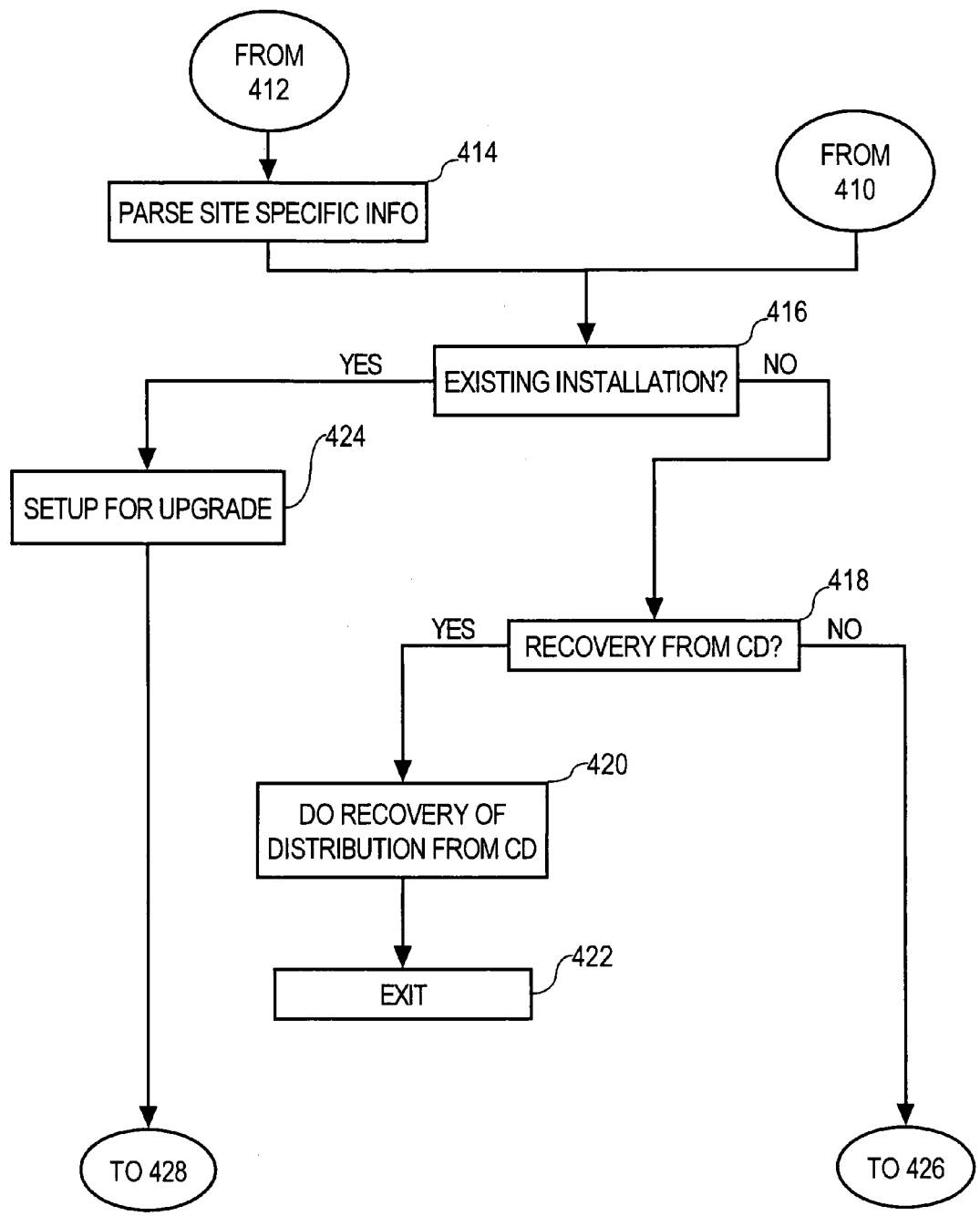
Figure 4C:
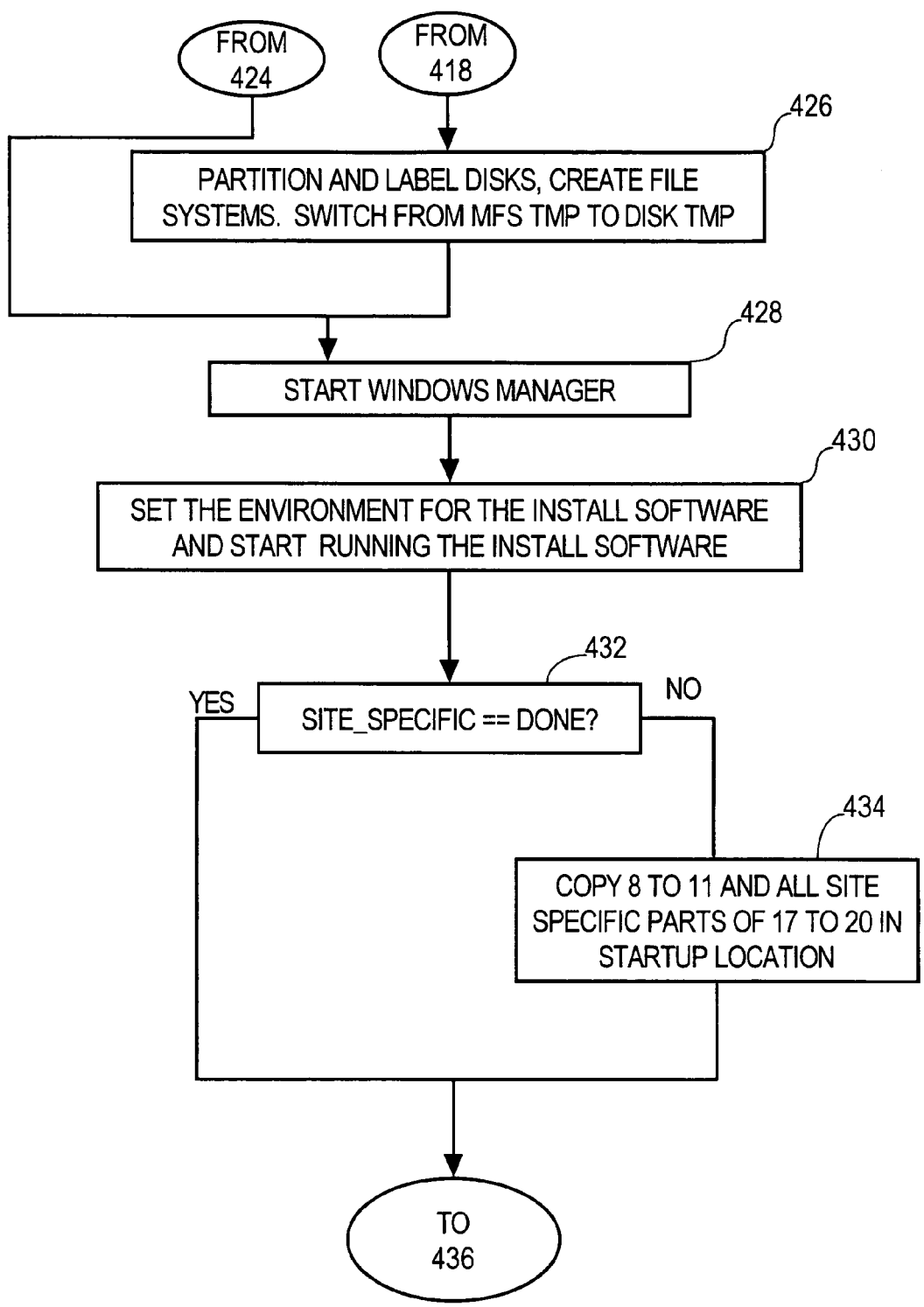
Figure 4D:
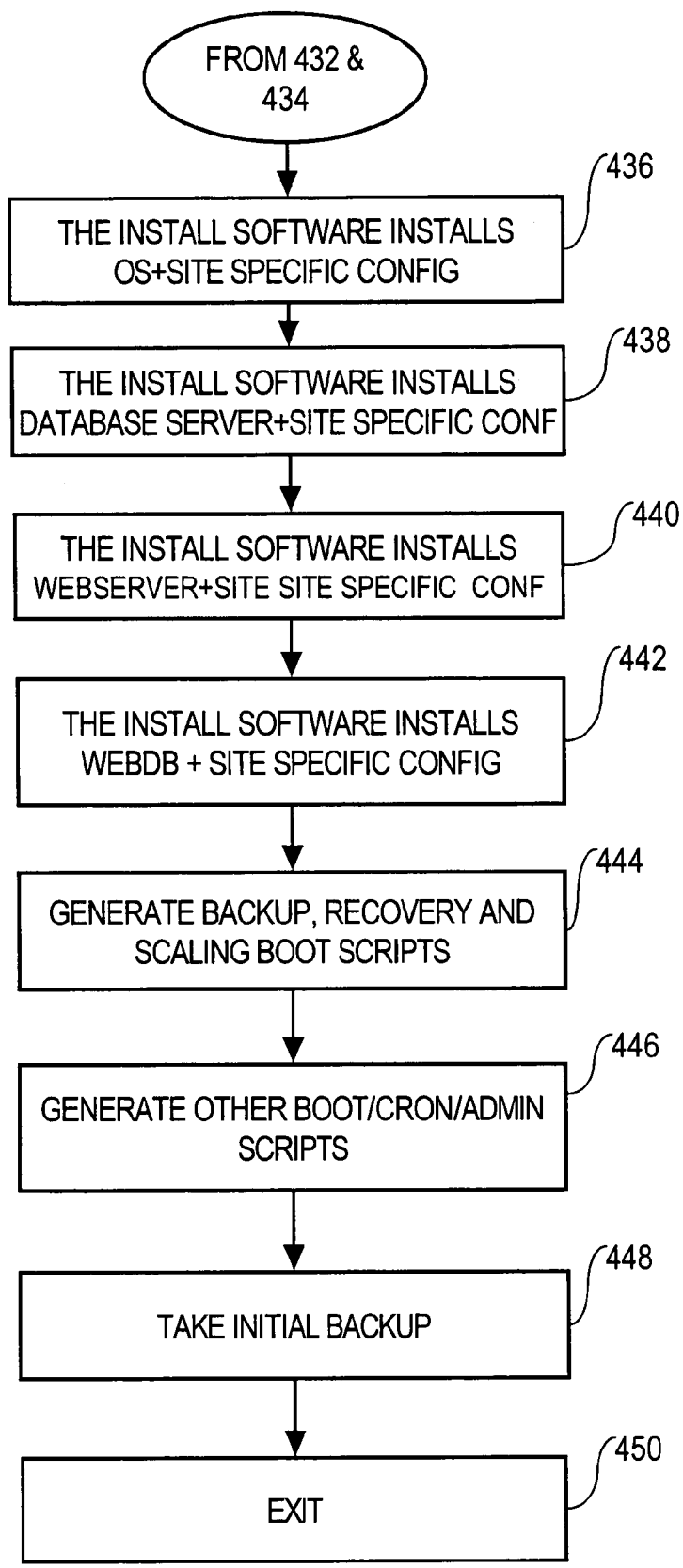

On sheet 10 of 10, in Figure 4D, Ref. Numeral 438, line 2, delete "CONF" and insert -- CONFIG --, therefor.

On sheet 10 of 10, in Figure 4D, Ref. Numeral 440, line 2, before "SPECIFIC" delete "SITE".

On sheet 10 of 10, in Figure 4D, Ref. Numeral 440, line 2, delete "CONF" and insert -- CONFIG --, therefor.

Signed and Sealed this

Seventeenth Day of August, 2010

David J. Kappos
*Director of the United States Patent and Trademark Office*